United States Patent [19]
Wimby et al.

[11] Patent Number: 5,644,996
[45] Date of Patent: Jul. 8, 1997

[54] METHOD AND ARRANGEMENT FOR REBURNING LIME SLUDGE IN A FLUIDIZING BED

[75] Inventors: Martin Wimby; Charlotta Hanson, both of Gothenburg, Sweden

[73] Assignee: Kvaerner Pulping Technologies AB, Sweden

[21] Appl. No.: 481,424
[22] PCT Filed: Dec. 2, 1993
[86] PCT No.: PCT/SE93/01036
   § 371 Date: Sep. 7, 1995
   § 102(e) Date: Sep. 7, 1995
[87] PCT Pub. No.: WO94/16140
   PCT Pub. Date: Jul. 21, 1994

[30] Foreign Application Priority Data

Jan. 11, 1993 [SE] Sweden ................ 9300044

[51] Int. Cl.[6] ............................... F23G 5/00
[52] U.S. Cl. ............... 110/245; 110/346; 422/168
[58] Field of Search ....................... 110/238, 243, 110/244, 245, 345

[56] References Cited

U.S. PATENT DOCUMENTS 5,335,609  8/1994  Nelson et al. ................ 110/346
5,345,884  9/1994  Vandycke et al. .............. 110/345

*Primary Examiner*—Henry A. Bennett
*Assistant Examiner*—Pamela A. O'Connor
*Attorney, Agent, or Firm*—Ronald P. Kananen

[57] ABSTRACT

The invention relates to a method for lime sludge reburning in a fluidizing bed. The method is characterized in that a cooling medium (10) is injected immediately above the fluidizing bed (3). The invention also comprises means for performing the method. The arrangement which is known per se is provided with an injection device (10) for a cooling medium above the fluidizing bed (3).

21 Claims, 1 Drawing Sheet

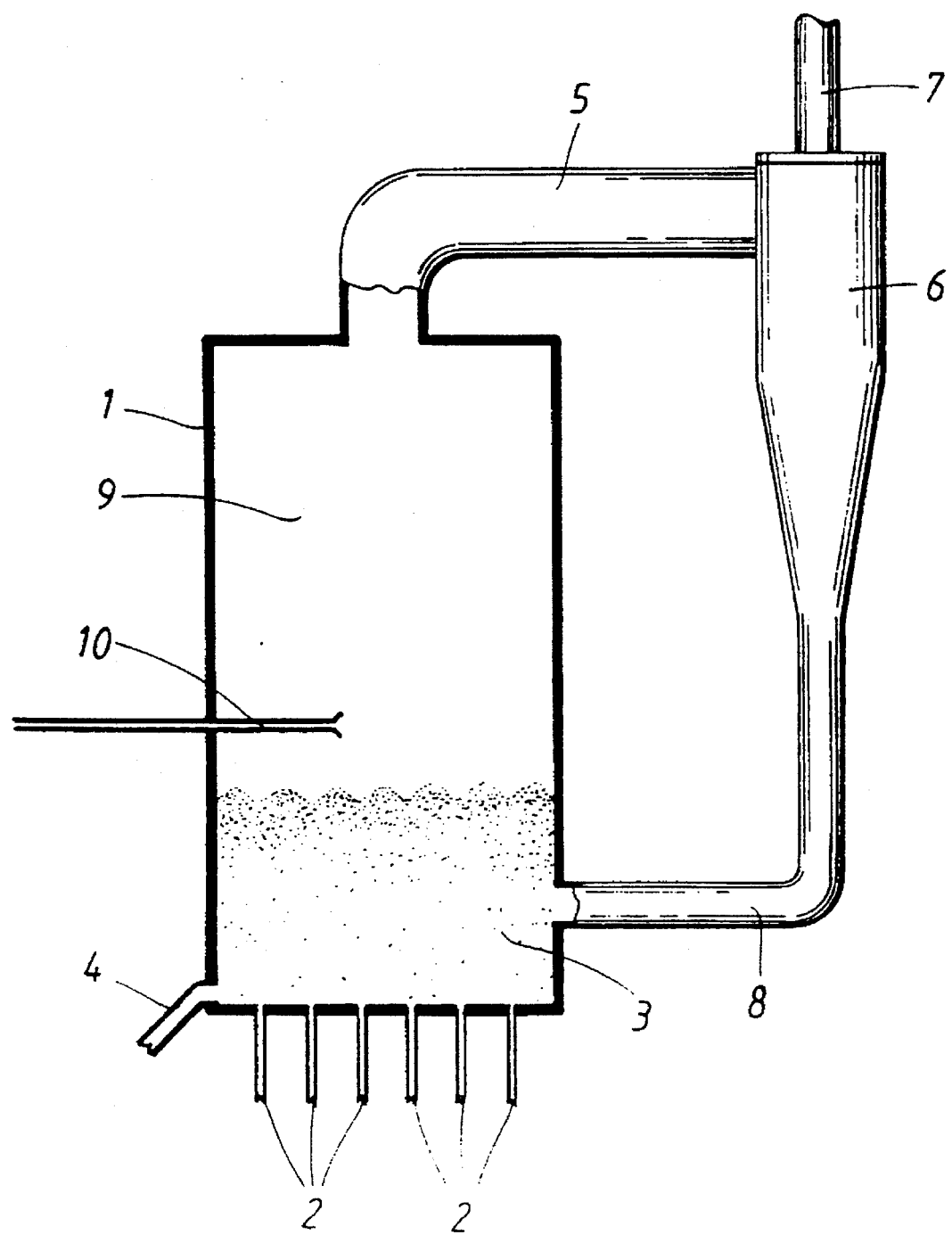

1

METHOD AND ARRANGEMENT FOR REBURNING LIME SLUDGE IN A FLUIDIZING BED

TECHNICAL FIELD

The present invention relates to a method for reburning or calcining lime sludge in a fluidising bed, whereby the calcium carbonate which is formed when preparing pulping liquor for the production of paper pulp according to the sulphate method is calcined to calcium oxide. The invention also comprises an improved fluidising reactor for the performance of the method.

STATE OF THE ART

Reburning or calcining of so-called lime sludge which has been formed during the preparation of pulping liquor for the production of paper pulp according the sulphate method is necessary for recovering the lime or the calcium oxide which is intended to be reused when preparing new batches of pulping liquor. This lime sludge reburning means that the lime sludge is heated to about 900° C. whereby carbon dioxide is released and calcium oxide is formed. The heating usually occurs by direct contact with fumes from burning of liquid, solid or gaseous combustibles.

The lime sludge reburning is normally carried out according to one of three technical methods, namely in a rotating tube-type furnace, in a fluidising bed or as suspension calcining.

In a fluidising bed, the lime sludge intended to be reburnt which is present as a very fine powder having a mean size of 20 μm, is fed into the hot bed where the calcining occurs, whereupon the thus formed calcium oxide particles bake into granules having a size of approximately 2–20 mm and sink down in the bed wherefrom they are taken out at the bottom level in a suitable way. The exiting hot calcium oxide granules are fed concurrently to the incoming combustion air to preheat the air to 300° C., for example.

THE PROBLEM

A part of the fine material which is fed into the fluidising bed will not, however be baked with other particles and will therefore follow the hot fumes upwards above the bed. There, some of these particles will come into contact with the walls of the reactor, which is somewhat cooler than the heating zone itself, and the particles will therefore bake to the walls. The temperature of these walls can be within the range 600°–800° C., which is the critical baking range for calcium oxide which is the dominant part of the particle mass. This covering is very hard and must of course be removed from time to time. In the wall areas of the reactor bed itself, however, no mentionable baking occurs on the walls due inter alia to the fact the granules which have been formed and move along the walls tend to keep these clean. There has, therefore, long been a strong desire to be able to perform the lime sludge reburning in a fluidised bed in such a way that these hard coverings above the bed itself are avoided.

THE SOLUTION

According to the present invention, the above problem has been solved by bringing about a method for lime sludge reburning in a fluidising bed using hot gases as a fluidising medium which is characterized in that a cooling medium is injected immediately above the fluidising bed.

According to the invention, it is suitable that the fluidising gas consists of fumes.

The cooling medium which can suitably be used in accordance with the invention is lime sludge that is to be reburnt. It is forseeable that the whole amount of lime sludge which is to be reburnt is added as cooling medium.

According to the invention, it is possible by means of the cooling medium to control the temperature in the area above the fluidising bed and keep this at a temperature below about 600° C., preferably at about 500° C.

According to the invention, the temperature in the fluidising bed should be below 1000° C., preferably about 875° C.

The solid material in the gases above the fluidising bed should, according to the invention, be separated, for instance, in a cyclone and thereafter fed into the fluidising bed.

The invention also comprises an arrangement for performing the above method, which arrangement comprises a fluidising reactor for lime sludge reburning which is known per se and which is characterized in that in the area above the fluidising bed, it is provided with an injection arrangement for a cooling medium, preferably a so-called splash plate.

FIGURE DESCRIPTION

The invention will be described in the following in more detail in connection with the attached figure which schematically shows a fluidising reactor according to the invention.

PREFERRED EMBODIMENT

In the figure, a fluidising reactor 1 for lime sludge reburning is shown. This reactor, which can have a height of 6–10 m, is provided in its bottom part with nozzles 2 for feeding of a fluidising medium. This medium can consist of hot fumes or oil and air whereby the oil is burnt in the fluidising reactor 1 and the air creates the high temperature necessary which should be below 1000° C., preferably 875° C. Above the nozzles 2, a fluidising bed 3 floats which consists of small and large pellets (2–20 mm) of calcium oxide and smaller freshly added particles which have not yet baked together. The large particles eventually sink and are removed at a suitable location through an opening 4 near the bottom part of the reactor 1.

At the upper part of the reactor 1, an outlet pipe 5 is provided for the fluidising medium and light calcined material. The light material is separated in the cyclone 6 and the fluidising medium leaves the cyclone at the exit 7. The separated material in the cyclone 6 is fed into the reactor 1 at its lower part directly into the fluidising bed through the supply pipe 8.

Above the fluidising bed 3 in the so-called free board 9, a supply arrangement 10 for cooling medium has been arranged. This cooling medium can according to the invention consist of non-treated lime sludge, but can also consist of some other material, both solid, liquid and gaseous material.

The importance of the addition of this cooling medium is that the temperature above the fluidising bed 3 is quickly cooled down to a suitable temperature, in the present case about 500° C. The content of solid particles in the fumes which rise from the bed is namely in a dominating amount calcium oxide and these have a baking temperature of between 600° C. and 800° C. By addition of a cooling medium, it is consequently possible to quickly lower the temperature above the bed 3 so that it drops below the baking temperature, preferably down to about 500° C. In this manner, baking of the fine particles on the walls of the reactor is avoided; instead, they travel upwards and are then fed via the supply pipe 8 after the separation in the cyclone 6 into the fluidising bed. It is possible to add the whole amount of lime sludge which is to be reburnt as cooling medium at a supply arrangement 10, but if it is desired to have a higher temperature, only a part can of course be added. The temperature can also be controlled by the temperature of the cooling medium itself. This temperature is about 150° C. for non-treated lime sludge as the lime sludge comes from a drying arrangement. If only a part of this lime sludge is added above the bed. The supply arrangement, the rest can be fed directly into the fluidising bed 3, for example through the pipe 8 which then also must be connected to some lime sludge container.

The supply arrangement 10 for the cooling medium can be of a different, kind but it is suitable that it consists of a so-called splash plate. The cooling medium is suitably sprayed into the free board 9 by means of air or some other gas.

A disadvantage with lime sludge reburning in a fluidising bed compared to rotating tube type furnaces is that the lime sludge which is fed into the reaction zone is not preheated, which makes the consumption of combustion higher than for rotating furnaces. In the present case, when the lime sludge is wholly or completely injected in the free board, it will be heated and the lime sludge which has been separated in the cyclone and fed into the fluidising bed 3 will be heated to about 500° C. This implies a substantial decrease of the consumption of combustibles compared to reburning in a reactor having the whole amount of the lime sludge fed directly into the fluidising bed 3 without preheating.

By means of the present invention, it has accordingly been posible to improve a method which is known by simple per se measures and make this more economic partly by avoiding covering of the inner walls of the free board, partly by improved heat economy.

The invention is not limited to the shown embodiments, but can be varied in different ways within the scope of the claims.

We claim:

1. A method for lime sludge reburning in a fluidising bed using hot gases as a fluidising medium, characterized in that a cooling medium (10) is injected immediately above the fluidising bed (3).

2. The method according to claim 1, characterized in that the fluidising gas consists of fumes.

3. The method according to claim 1, characterized in that the cooling medium (10) consists of lime sludge which is to be reburnt.

4. The method according to claim 1, characterized in that the whole amount of lime sludge which is to be reburnt is added as a cooling medium (10).

5. The method according to claim 1, characterized in that the temperature in the area (9) above the fluidising bed (3) is cooled to a temperature of below about 600° C., preferably about 500° C.

6. The method according to claim 1, characterized in that the temperature in the fluidising bed (3) is below 1000° C., preferably about 875° C.

7. The method according to claim 1, characterized in that the solid material in the gases above the fluidising bed (3) is separated in for example a cyclone (6) and is fed into the fluidising bed (3).

8. An arrangement for performing the method according to claims 1, 2, 3, 4, 5, 6 or 7, comprising a fluidising reactor (1) for lime sludge reburning, characterized in that in the area (9) above the fluidising bed (3), and further, is provided an injection device (10) as a cooling medium.

9. The method according to claims 1, 2 or 3, characterized in that the whole amount of lime sludge to be reburnt is added as the cooling medium (10).

10. The method according to claim 9, characterized in that the temperature in the area (9) above the fluidising bed (3) is cooled to a temperature of below about 600° C., preferably about 500° C.

11. The method according to claim 10, characterized in that the temperature in the fluidising bed (3) is below 1000° C., preferably about 875° C.

12. The method according to claim 11, characterized in that the solid material is separated from the gases above the fluidising bed (3) in a separation means.

13. A method for reburning lime sludge in a fluidising bed using hot gases as a fluidising medium, comprising a step of injecting a cooling medium (10) above the fluidising bed (3) into a lower part of a free board (9) above the fluidised bed (9), to maintain the temperature in the free board (9) above the fluidising bed (3) below about 600° C.

14. A method as set forth in claim 13, wherein the temperature in the free board (9) is preferably maintained below about 500° C.

15. A method as set forth in claim 13, wherein the hot gases used as a fluidising medium consist of fumes.

16. A method as set forth in claim 13, wherein the step of injecting the cooling medium is further characterized in that the cooling medium (10) consists of lime sludge which is to be reburnt.

17. A method as set forth in claim 13, wherein the step of injecting the cooling medium is further characterized as consisting of adding as the cooling medium to the whole amount of lime sludge which is to be reburnt.

18. A method as set forth in claim 13, further including the step of maintaining the temperature in the fluidising bed (3) below 1000° C.

19. A method as set forth in claim 18, wherein the step of maintaining the temperature is further characterized in that the temperature is below about 875° C.

20. A method as set forth in claim 13, further including a step of separating solid material in the gases above the fluidising bed (3) and feeding the gases into the fluidised bed.

21. A method as set forth in claim 20, wherein the step of separating is carried out in a cyclone (6).

* * * * *